US009231962B1

(12) United States Patent
Yen et al.

(10) Patent No.: US 9,231,962 B1
(45) Date of Patent: Jan. 5, 2016

(54) IDENTIFYING SUSPICIOUS USER LOGINS IN ENTERPRISE NETWORKS

(71) Applicant: EMC Corporation, Hopkinton, MA (US)

(72) Inventors: Ting-Fang Yen, Cambridge, MA (US); Alina Oprea, Arlington, MA (US)

(73) Assignee: EMC Corporation, Hopkinton, MA (US)

( * ) Notice: Subject to any disclaimer, the term of this patent is extended or adjusted under 35 U.S.C. 154(b) by 136 days.

(21) Appl. No.: 14/138,961

(22) Filed: Dec. 23, 2013

Related U.S. Application Data

(60) Provisional application No. 61/903,006, filed on Nov. 12, 2013.

(51) Int. Cl.
G06F 21/31 (2013.01)
H04L 29/06 (2006.01)

(52) U.S. Cl.
CPC .......... H04L 63/1408 (2013.01); G06F 21/316 (2013.01); H04L 63/08 (2013.01)

(58) Field of Classification Search
CPC .............................. H04L 63/08; G06F 21/316
USPC .......................................................... 726/25
See application file for complete search history.

(56) References Cited

U.S. PATENT DOCUMENTS

| 8,495,726 | B2 | 7/2013 | Agarwal et al. | |
|---|---|---|---|---|
| 2007/0180225 | A1* | 8/2007 | Schmidt | 713/152 |
| 2007/0261112 | A1 | 11/2007 | Todd et al. | |
| 2008/0155651 | A1* | 6/2008 | Wasmund | 726/2 |
| 2009/0222907 | A1 | 9/2009 | Guichard | |
| 2010/0095374 | A1* | 4/2010 | Gillum et al. | 726/22 |
| 2011/0185401 | A1* | 7/2011 | Bak et al. | 726/5 |
| 2012/0109821 | A1* | 5/2012 | Barbour et al. | 705/44 |
| 2012/0246720 | A1* | 9/2012 | Xie et al. | 726/22 |
| 2013/0124717 | A1 | 5/2013 | Stevens et al. | |

OTHER PUBLICATIONS

U.S. Appl. No. 13/731,654, filed Dec. 31, 2012, titled: Time Sanitization of Network Logs from a Geographically Distributed Computer System.
U.S. Appl. No. 13/731,643, filed Dec. 31, 2012, titled: Framework for Mapping Network Addresses to Hosts in an Enterprise Network.
U.S. Appl. No. 13/731,635, filed Dec. 31, 2012, titled: Anomaly Sensor Framework for Detecting Advanced Persistent Threat Attacks.

(Continued)

Primary Examiner — Dao Ho
(74) Attorney, Agent, or Firm — Ryan, Mason & Lewis, LLP

(57) ABSTRACT

Methods, apparatus and articles of manufacture for identifying suspicious user logins in enterprise networks are provided herein. A method includes processing log data derived from one or more data sources associated with an enterprise network, wherein the enterprise network comprises multiple hosts; generating a set of profiles, wherein the set comprises a profile corresponding to each of multiple users and a profile corresponding to each of the multiple hosts, wherein each profile comprises one or more login patterns based on historical login information derived from said log data; and analyzing a login instance within the enterprise network against the set of profiles.

20 Claims, 4 Drawing Sheets

(56) References Cited

OTHER PUBLICATIONS

Abu et al., A Multifaceted Approach to Understanding the Botnet Phenomenon. In ACM SIGCOMM Conf. Internet Measurement, 2006, pp. 1-12.
Antonakakis et al., Building a Dynamic Reputation System for DNS. In USENIX Security, 2010, pp. 1-17.
Antonakakis et al., Detecting Malware Domains at the Upper DNS Hierarchy. In USENIX Security, 2011, pp. 1-16.
Antonakakis et al., From Throw-away Traffic to Bots: Detecting the Rise of DGA-based Malware. In USENIX Security, 2012, pp. 1-16.
Bilge et al., Disclosure: Detecting Botnet Command and Control Servers Through Large-scale NetFlow Analysis. In ACSAC, 2012, pp. 1-10.
Bilge et al., EXPOSURE: Finding Malicious Domains Using Passive DNS Analysis. In NDSS, 2011, pp. 1-17.
Binkley et al., An Algorithm for Anomaly-based Botnet Detection. In USENIX WKSP. Steps to Reducing Unwanted Traffic on the Internet, 2006, pp. 43-48.
Brauckhoff et al., Anomaly Extraction in Backbone Networks Using Association Rules. In ACM SIGCOMM Conf. Internet Measurement, 2009, pp. 1-7.
Chapple et al., Authentication Anomaly Detection: A Case Study on a Virtual Private Network. In ACM Wksp. Mining Network Data, 2007, pp. 1-6.
Choi et al., Botnet Detection by Monitoring Group Activities in DNS Traffic. In IEEE Intl. Conf. Computer and Information Technology, 2007, pp. 715-720.
Cooke et al., The Zombie Roundup: Understanding, Detecting, and Disrupting Botnets. In USENIX Wksp. Steps to Reducing Unwanted Traffic on the Internet, 2005, pp. 1-6.
Dewaele et al., Extracting Hidden Anomalies Using Sketch and non Gaussian Multi-resolution Statistical Detection Procedures. In ACM Wksp. Large Scale Attack Defense, 2007, pp. 1-8.
Francois et al., BotTrack: Tracking Botnets Using NetFlow and PageRank. In Intl. IFIP TC 6 Conf. Networking. Springer-Verlag, 2011, pp. 1-14.
Freiling et al., Botnet Tracking: Exploring a Root-cause Methodology to Prevent Distributed Denial-of-service Attacks. In European Conf. Research in Computer Security. Springer-Verlag, 2005, pp. 1-32.
Gu et al., BotMiner: Clustering Analysis of Network Traffic for Protocol- and Structure-independent Botnet Detection. In USENIX Security, 2008, pp. 139-154.
Gu et al., BotHunter: Detecting Malware Infection Through IDS-driven Dialog Correlation. In USENIX Security, 2007, pp. 1-16.
Gu et al., BotSniffer: Detecting Botnet Command and Control Channels in Network Traffic. In NDSS, 2008, pp. 1-18.
Holz et al., Measuring and Detecting Fast-Flux Service Networks. In NDSS, 2008, pp. 1-12.
John et al., Studying Spamming Botnets Using Botlab. In USENIX NSDI, 2009, pp. 1-15.
Jolliffe. Principal Component Analysis. Springer-Verlag, 1986, pp. 1-56.
Karasaridis et al., Wide-scale Botnet Detection and Characterization. In USENIX Wksp. Hot Topics in Understanding Botnets, 2007, pp. 1-8.
Levine et al., The Use of Honeynets to Detect Exploited Systems Across Large Enterprise Networks. In IEEE Wksp. Information Assurance, 2003, pp. 92-99.
Livadas et al., Using Machine Learning Techniques to Identify Botnet Traffic. In IEEE Conf. Local Computer Networks, 2006, pp. 1-6.
Ma et al., Beyond Blacklists: Learning to Detect Malicious Web Sites from Suspicious URLs. In ACM SIGKDD Intl. Conf. Knowledge Discovery and Data Mining, 2009, pp. 1-9.
Nazario et al., As the Net Churns: Fast-flux Botnet Observations. In Intl. Conf. on Malicious and Unwanted Software, 2008, pp. 1-9.
Passerini et al., FluXOR: Detecting and Monitoring Fast-Flux Service Networks. In Intl. Conf. Detection of Intrusions and Malware, and Vulnerability Assessment. Springer-Verlag, 2008, pp. 1-20.
Perdisci et al., Detecting Malicious Flux Service Networks through Passive Analysis of Recursive DNS Traces. In ACSAC, 2009, pp. 1-10.
Ramachandran et al., Understanding the Network-level Behavior of Spammers. In ACM Conf. on Applications, Technologies, Architectures, and Protocols for Computer Communications, 2006, pp. 1-12.
Sperotto et al., Anomaly Characterization in Flow-Based Traffic Time Series. In IEEE Intl. Wksp. IP Operations and Management. Springer-Verlag, 2008, pp. 1-13.
Stone-Gross et al., Your Botnet is My Botnet: Analysis of a Botnet Takeover. In ACM CCS, 2009, pp. 1-13.
Strayer et al., Detecting Botnets with Tight Command and Control. In IEEE Conf. Local Computer Networks, 2006, pp. 1-8.
Villamarin-Salomon et al., Bayesian Bot Detection Based on DNS Traffic Similarity. In ACM Symp. Applied Computing, 2009, pp. 2035-2041.
Wagner et al., Entropy Based Worm and Anomaly Detection in Fast IP Networks. In IEEE Intl. Wksp. Enabling Technologies: Infrastructure for Collaborative Enterprise, 2005, pp. 1-6.
Yadav et al., Detecting Algorithmically Generated Malicious Domain Names. In ACM SIGCOMM Conf. Internet Measurement, 2010, pp. 1-14.
Yadav et al., Winning With DNS Failures: Strategies for Faster Botnet Detection. In Intl. ICST Conf. Security and Privacy in Communication Networks, 2011, pp. 1-10.
Yen et al., Traffic Aggregation for Malware Detection. In Intl. Conf. Detection of Intrusions and Malware, and Vulnerability Assessment. Springer-Verlag, 2008, pp. 207-227.
Zhang et al., Safeguarding Academic Accounts and Resources with the University Credential Abuse Auditing System. In Intl. Cont. Dependable Systems and Networks. IEEE Computer Society, 2012, pp. 1-8.
Page et al., "The PageRank citation ranking: Bringing order to the web." 1998, pp. 1-17.
Rosvall et al., "Maps of random walks on complex networks reveal community structure," PNAS, vol. 105, No. 4, pp. 1118-1123, Jan. 29, 2008, pp. 1-62.
U.S. Appl. No. 14/139,003, filed Dec. 23, 2013, titled: Detecting Suspicious Web Traffic from an Enterprise Network.
U.S. Appl. No. 14/139,047, filed Dec. 23, 2013, titled: Behavioral Detection of Suspicious Host Activities in an Enterprise.
U.S. Appl. No. 14/139,019, filed Dec. 23, 2013, titled: Modeling User Working Time Using Authentication Events within an Enterprise Network.
U.S. Appl. No. 14/698,201, filed Apr. 28, 2015, titled: Defending Against a Cyber Attack via Asset Overlay Mapping.

* cited by examiner

IDENTIFYING SUSPICIOUS USER LOGINS IN ENTERPRISE NETWORKS

CROSS-REFERENCE TO RELATED APPLICATION

The present application claims priority to U.S. Provisional Patent Application Ser. No. 61/903,006, filed Nov. 12, 2013, entitled "A Method for Identifying Suspicious User Logins in Enterprise Networks," incorporated by reference herein in its entirety.

FIELD

The field relates generally to information technology (IT), and more particularly to IT security within enterprises.

BACKGROUND

Many services that require user authentication deploy security measures against account compromise. Such existing security measures include checking whether a given user is logged in from a recognized device or location. While the nature of authentication data commonly precludes observation of the source of an authentication attempt within an enterprise network, the origin of a login, being within the enterprise network, is trusted information.

Multiple challenges exist in analyzing authentication log data. For example, there exists a semantic gap between what is recorded in the logs and the actual authentication activity that took place (for instance, there are at least 31 different Windows® authentication messages describing user logins). Also, domain controller logs can be extremely noisy. In addition to users entering passwords, it is also common for automated processes on hosts, such as email clients, to request authentication and authorization on behalf of a user. Further, new users and machines are continuously introduced into the enterprise network, and the activities corresponding thereto, though technically new, are often not anomalous.

Additionally, yet another challenge includes the presence and/or introduction of new logins via existing users accessing machines that those users have not previously accessed. Accordingly, a need exists for techniques to identify and analyze destination machines accessed by a given user that are unusual for that user.

SUMMARY

One or more illustrative embodiments of the present invention provide techniques for identifying suspicious user logins in enterprise networks. In accordance with an aspect of the invention, a method is provided comprising the steps of: processing log data derived from one or more data sources associated with an enterprise network, wherein the enterprise network comprises multiple hosts; generating a set of profiles, wherein the set comprises a profile corresponding to each of multiple users and a profile corresponding to each of the multiple hosts, wherein each profile comprises one or more login patterns based on historical login information derived from said log data; and analyzing a login instance within the enterprise network against the set of profiles.

In accordance with another aspect of the invention, a method is provided comprising the steps of: processing log data derived from one or more data sources associated with an enterprise network; generating a set of profiles, wherein the set comprises a profile corresponding to each of multiple users and a profile corresponding to each of the multiple hosts, wherein each profile comprises one or more login patterns based on historical login information derived from said log data; and creating a graph of login activities based on said set of profiles, wherein said graph comprises (i) nodes representing said multiple users and said multiple hosts within the enterprise network, and (ii) edges representing login attempts linking together user-host pairs. The method further comprises the steps of: identifying one or more communities in said graph, wherein a community corresponds to a group of one or more users and one or more hosts that exhibit a specified level of interaction; analyzing a login instance within the enterprise network against said graph; identifying the login instance as inconsistent with the historical login information contained in said graph; and outputting said identification of the inconsistent login instance.

The techniques of the illustrative embodiments described herein overcome one or more of the problems associated with the conventional techniques described previously, and provide techniques to detect suspicious user logins in an enterprise network. These and other features and advantages of the present invention will become more readily apparent from the accompanying drawings and the following detailed description.

DETAILED DESCRIPTION

As will be described herein, the present invention, in one or more illustrative embodiments, provides techniques for identifying suspicious user logins in enterprise networks. At least one embodiment of the invention includes analyzing log data generated by various sources such as domain controllers (for example, Windows® domain controllers) to identify suspicious user authentication attempts. Domain controllers (DC), as referred to herein, are servers within a domain (such as the Windows® domain) that perform authentication and authorization checks, wherein a "domain" refers to resources and machines that share a centralized user directory.

As detailed herein, at least one embodiment of the invention includes identifying suspicious user authentication attempts that result from a credential compromise; that is, a situation wherein an attacker has access to a user's account and leverages this information to pivot to other machines or resources within the enterprise's internal network. Such an embodiment can include, for example, an expectation and/or consideration that the attacker's behavior, in attempting to gain access to other hosts, will deviate from the behavior of the original user as observed against a period of past activity.

Illustrative embodiments of the present invention will be described herein with reference to exemplary communication systems and associated processing devices. It is to be appreciated, however, that the invention is not restricted to use with the particular illustrative system and device configurations shown. Accordingly, a communication system or computing device, as used herein, is intended to be broadly construed so as to encompass any type of system in which multiple processing devices can communicate with one or more other devices.

Figure 1:
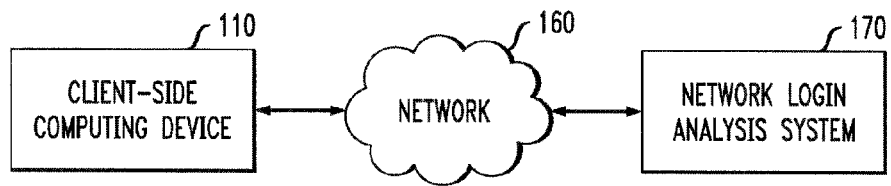
FIG. 1 is a diagram illustrating an example network environment in which one or more embodiments of the present invention can operate.

FIG. 1 illustrates an example client-side computing device (CSCD) 110 communicating with network login analysis system 170 over a network 160. The network 160 can include, for example, a global computer network such as the Internet, a wide area network (WAN), a local area network (LAN), a satellite network, a telephone or cable network, or various portions or combinations of these and other types of networks.

In at least one embodiment of the invention, the CSCD 110 is a customer server which updates the network login analysis system 170 with data. Accordingly, the CSCD 110 may represent a portable device, such as a mobile telephone, personal digital assistant (PDA), wireless email device, game console, etc. The CSCD 110 may alternatively represent a desktop or laptop personal computer (PC), a microcomputer, a workstation, a mainframe computer, or any other information processing device which can benefit from the use of fraud detection techniques in accordance with the invention. It is to be appreciated that a given embodiment of the disclosed system may include multiple instances of CSCD 110 and possibly other system components, although only a single instance is shown in the example system diagram of FIG. 1 for clarity of illustration.

The CSCD 110 may also be referred to herein as simply a "user." The term "user," as used in this context, should be understood to encompass, by way of example and without limitation, a user device, a person (or employee, for example) utilizing or otherwise associated with the device, or a combination of both. An operation described herein as being performed by a user may therefore, for example, be performed by a user device, a person utilizing or otherwise associated with the device, or by a combination of both the person and the device. Similarly, information described as being associated with a user may, for example, be associated with a CSCD device 110, a person utilizing or otherwise associated with the device, or a combination of both the person and the device.

Figure 2:
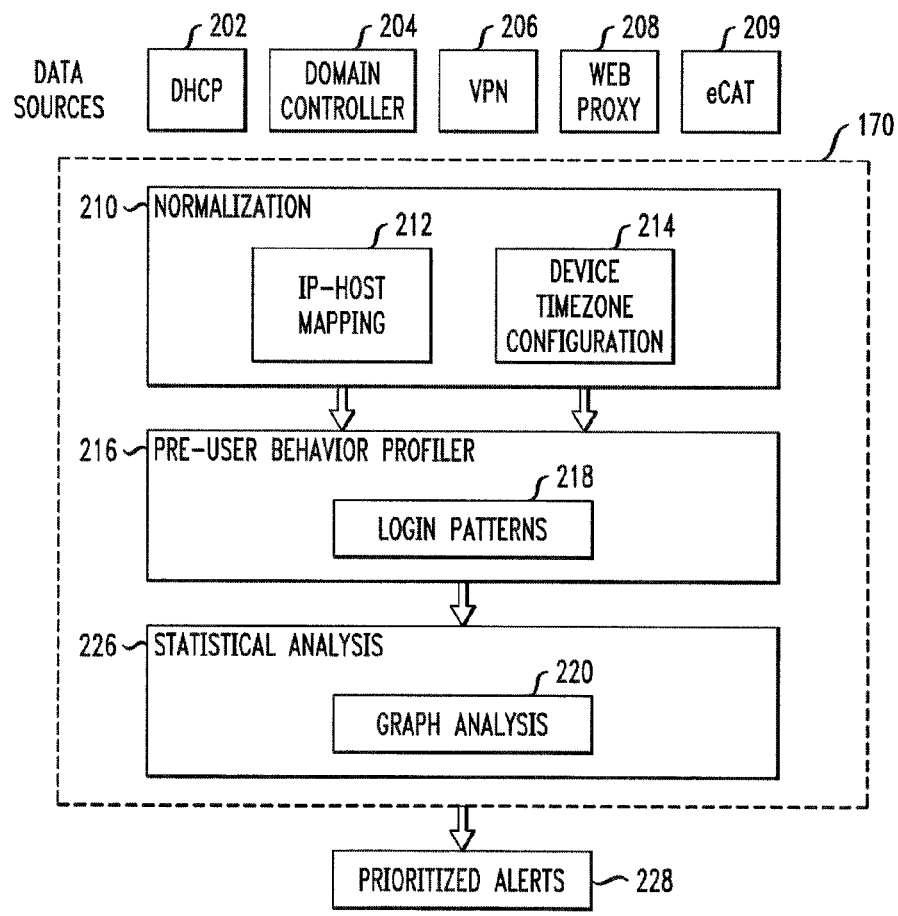
FIG. 2 is a block diagram illustrating example system components, according to an embodiment of the invention.

An exemplary network login analysis system (such as system 170 in FIG. 1) is described in additional detail below in connection with FIG. 2. FIG. 2 is a block diagram illustrating example system components, according to an embodiment of the invention. As depicted in FIG. 2, the network login analysis system 170 acts on data received from various sources. Such data sources can include, for example, dynamic host configuration protocol (DHCP) servers 202, domain controllers 204, virtual private networks (VPNs) 206, web proxies 208 and enterprise malware threat detection software (such as, for example, eCAT) 209. Such data sources, as detailed herein, are processed and analyzed by the network login analysis system 170 to ultimately generate prioritized alerts 228.

As also depicted in FIG. 2, the network login analysis system 170 includes three layers: (1) a normalization layer 210 that includes functionality to parse, filter, and normalize log data using network-specific configuration information; (2) a per-user behavior profiler layer 216 that processes normalized log data to produce user behavior data; and (3) a statistical analysis layer that performs one or more analytical techniques on the user behavior data to identify outlying and/or suspicious activity, which the system 170 reports as incidents and/or prioritized alerts 228.

Accordingly, as depicted in FIG. 2, the network login analysis system 170 includes the normalization layer 210, wherein the timestamps of all log entries (as received from the one or more data sources, as noted above) are normalized (for example, normalized to Coordinated Universal Time (UTC)) via device time zone configuration component 214. Additionally, the normalization layer 210 determines statically and dynamically assigned internet protocol (IP) addresses of hosts, and constructs bindings between hosts and IP addresses via IP-host mapping component 212, thus attributing every logged event to a specific host.

By way merely of example, as noted above, at least one embodiment of the invention includes the use of authentication logs generated by Windows® domain controllers. Table 1 below depicts fields in logs generated by a Windows® domain controller. For each authentication event, a log is generated, and the log can include the time at which the login attempt was made, the username, the IP address of the host onto which the user attempts to log in, a description of the type of login event, and whether the login was successful.

TABLE 1

Fields in Windows ® domain controller logs.

| Field | Description |
| --- | --- |
| Event_time | Timestamp of the login event |
| Paddr | The IP address of the domain controller |
| Saddr | The IP address of the host onto which the user attempts to log in |
| Username | The user attempting the login |
| ID | The identifier (ID) of the event (related to logins) |
| Event_description | The description of the event |
| Event_type | Whether the login attempt was successful |

In the example embodiment described in connection with Table 1, the only events being considered are Windows® events that correspond to user authentication activities. Additionally, one or more embodiments of the invention include distinguishing between two authentication cases: 1) a case wherein a user logs in by entering his or her password, and 2) a case wherein a user requests access to a host or resource via a Kerberos ticket.

As noted above, an aspect of the invention includes performing pre-processing actions before the logs are used for analysis. For example, the "Event_time" timestamps are recorded in the local time zone of the domain controller "Paddr." To enable correlation between logs generated by different domain controllers, at least one embodiment of the invention, as noted above, can include normalizing all timestamps into UTC.

As depicted in FIG. 2, in the normalization layer 210, the device time zone configuration component 214 can leverage the common use by enterprises of a central security information and event management (SIEM) system for log management that tags each log entry with its own timestamp $t_{siem}$, recording the time at which the log was received by the SIEM. For each device that sends logs to the SIEM system, at least one embodiment of the invention includes computing a set of time difference values $\Delta_i = t_{siem,i} - t_{device,i}$ (that can be, for example, rounded off to the nearest 30 minutes) from each log entry i generated over a time period (for example, one month). Additionally, such an embodiment includes determining the timestamp correction value $\Delta_{correction}$ for the device by setting the correction value to the value $\Delta_i$ that accounts for the majority of differences. Applying this correction value to each device timestamp produces a normalized timestamp value, $t_{normalized,i} = t_{device,i} + \Delta_{correction}$. By way merely of example, $t_{normalized,i}$ can be configured to correspond to UTC. Additional description of an exemplary normalization technique can be found, for example, in U.S. patent application Ser. No. 13/731,654, entitled "Time Sanitization of Network Logs from a Geographically Distributed Computer System," filed on Dec. 31, 2012, and incorporated by reference herein in its entirety. Accordingly, at least one embodiment of the invention includes applying the above normalization technique to each device on a network that produces log data, normalizing all log timestamps (for example, to UTC).

Additionally, the logs can record the IP address of the host to which the user is attempting to authenticate (rather than the hostname, for example). In cases wherein dynamic IP addresses are used, the same IP address can be assigned to different hosts at different times. To map the dynamic IP addresses to host names, at least one embodiment of the invention includes parsing DHCP logs to infer time intervals wherein an IP address is assigned to a particular host, and correlating that information with the domain controller logs.

As depicted in FIG. 2 and noted above, the system 170 includes an IP-host mapping component 212 as a part of the normalization layer 210. The IP-host mapping component 212 analyzes DHCP server logs collected in a SIEM system and constructs a database of IP-to-host mappings (also referred to herein as bindings) over time. Each binding is represented as a tuple {IP address, host name, media access control (MAC) address, start-time, end-time} mapping an IP address to a host in a specific time interval. The algorithm implemented to carry out the mapping can be run at intervals (for example, daily) to update existing bindings as new DHCP logs become available. Given the resulting database of bindings, at least one embodiment of the invention can include identifying the host corresponding to a given IP address with reference to a normalized timestamp. Additional description of an exemplary mapping technique can be found, for example, in U.S. patent application Ser. No. 13/731,643, entitled "Framework for Mapping Network Addresses to Hosts in an Enterprise Network," filed on Dec. 31, 2012, and incorporated by reference herein in its entirety.

It is also noted that user logins, similar to many other user activities within an enterprise network, can be largely consistent over time. This is partly due, for example, to the fact that users in an enterprise often have specific job functions, and such users are allowed access to hosts relevant to corresponding duties. In identifying suspicious user logins, at least one embodiment of the invention includes determining and/or identifying cases wherein a user is accessing hosts or resources that are unusual and/or unexpected for that user (or that type of user).

To define what is common for a user (or a type of user), at least one embodiment of the invention includes creating and maintaining a login profile for each user in the enterprise. As depicted in FIG. 2, such a profile can be created and maintained via per-user behavior profiler 216, which further includes a login pattern component 218. By way of example, a user login profile can include a list of the hosts onto which the user successfully logged in, the number of times that the user logged on to that host, and the timestamp of the first and last time that the user logged on thereto. Such a profile is continuously updated via per-user behavior profiler 216 as new logs are generated (and normalized via normalization layer 210).

A host can be expired or removed from a given user's login profile if the user has not logged on to that host for a given amount of time (more than 90 days, for example) to accommodate changes in user behavior (such as, for example, changes corresponding to changes in the user's job function). Additionally, and as further described herein, given a user's historical login profile, at least one embodiment of the invention includes identifying an unusual and/or unexpected login when the user accesses a host that he or she has never (or has rarely) accessed before.

To ensure that there exists sufficient historical information to infer patterns in user login activity, and to avoid generating false alarms for new users and hosts joining the network, at least one embodiment of the invention includes requiring a minimum temporal period for profile generation. By way of example, an illustrative embodiment might require 30 days for which the user is active on the network (that is, 30 days wherein authentication attempts can be observed for that user) before alerts are generated for the user.

Also, it is common in an enterprise network to have multiple hosts providing the same service (for example, mail servers, domain name system (DNS) servers, etc.) for both redundancy and load-balancing. This can result in benign "new" logins, wherein a user accesses a host that he or she has not accessed before, but that host provides the same service or resource as another host in the user's login profile. Conversely, it is also common for users belonging to the same group or serving similar job functions to access the same set of hosts (for example, developers accessing code servers). Accordingly, an aspect of the invention includes determining and/or learning an underlying structure of such login activities so as to lower the rate of false alarms. Such functions can be carried out via the statistical analysis layer 226, for example, via a graph analysis component 220.

Given the login profiles of a set of users, at least one embodiment of the invention includes building a bipartite graph of login activities. Nodes in such a graph correspond to users and hosts, and edges indicate login attempts, linking together {user, host} pairs. Additionally, such an embodiment of the invention further includes identifying communities in the login graph, wherein a community corresponds to a group of users and/or hosts that exhibit a level of interaction. While the level of interaction is not a configurable parameter, at least one embodiment of the invention includes implementing an algorithm for identifying community structure in networks. Additional description of such an algorithm can be found, for example, in Rosvall et al., "Maps of random walks on complex networks reveal community structure," PNAS, vol. 105, no. 4, pages 1118-1123, Jan. 29, 2008, which is incorporated by reference herein in its entirety. Such an algorithm attempts to partition a given graph in a way that minimizes the number of bits required to encode a random walk on that graph. The algorithm additionally includes traversing the graph, using random walks, to identify modules that compose the graph. The random walks enable each node to be assigned a probability indicating the frequency at which the node is visited, and also provides insight into modules of nodes wherein there is a higher probability of movement within a module. The probability of a node being visited can be computed by performing a large number of random walks on the graph, and determining the number of times that the node is traversed.

Additionally, at least one embodiment of the invention includes assigning scores to login-related data. Accordingly, not all unexpected or suspicious logins are to be considered as equal. For example, it may be more likely for an administrator user that manages end hosts to log in to a new machine than it is for a non-administrator user to do so. It can also be common for a popular Exchange server to see new users logging in because that given server may be one of many Exchange servers that serve a large user population.

As such, to distinguish these potentially benign new logins from those that are suspicious (that is, potentially harmful), at least one embodiment of the invention includes computing a score for each user and each host that captures the degree of suspiciousness for a login from that user or to that host. In such an embodiment, an algorithm for assigning scores to users and hosts is implemented wherein the importance (or magnitude) of a node in a graph is determined by the importance of nodes that link thereto. Given the login profiles for a set of users and hosts observed over a period of time (for example, 30 days), the algorithm includes computing a score for each user and host as follows. Notations for the algorithm include: Score(U)=the score for user U; Score(H)=the score for host H; Login(U)=the set of hosts to which user U has logged in; and Login(H)=the set of users that has logged in to host H.

In at least one illustrative embodiment of the invention, the score for host H is set to be the inverse of the number of users that logged in to H: Score(H)=1/|Login(H)|. Also, the score for user U is set to be the sum of the scores of hosts to which U has logged in: Score(U)=$\Sigma_{(H\ in\ Login(U))}$ Score(H). As such, the higher that Score(H) is for host H, the fewer the number of users that have logged in thereto, and consequently, the more dedicated H is and the more suspicious it is to observe a new user logging in to H. Similarly, the smaller that Score(U) is for user U, the less dedicated he or she is to the hosts to which he or she has logged in, and the less suspicious it is to observe U logging in to a new host.

Additionally, in at least one embodiment of the invention, the scoring algorithm can be generalized for a login alert to use any function of the individual user and host scores. For instance, user and host scores can be combined with different weights to favor hosts with a certain profile (for example, single-user hosts), or users with a certain role (for example, system administrators).

As noted herein, the login profiles (created and maintained via profiler 216, as depicted in FIG. 2) record the historical login behavior of each of multiple users, and the communities in a login graph indicate the behavior of correlated users and hosts. At least one embodiment of the invention includes combining these items of information and detecting a suspicious user login that is both unusual for the user (for example, the host is not in that user's login profile) and also outside the community with which the user normally interacts (for example, the host and the user reside in different communities). Each suspicious login can be assigned a score set to the sum of the corresponding user score and host score, which allows prioritization of the alerts (such as depicted via component 228 in FIG. 2).

In addition to detecting suspicious user logins, another application of the users' login profiles includes distinguishing between different types of hosts in the enterprise. In an enterprise with different administrative domains, it can be difficult to maintain up-to-date and complete documentation pertaining to the role of hosts in the network. Using login profiles, however, at least one embodiment of the invention can include identifying, for example, dedicated end hosts (which are associated with only a single user), and distinguishing such hosts from servers that are accessed by multiple users. Similarly, for servers, at least one embodiment of the invention can include categorizing the servers based on load (that is, the number of users) and type (that is, which users accessed the servers, and from which departments or groups).

As also detailed herein and depicted in FIG. 2, at least one embodiment of the invention includes generating incidents (also identified as prioritized alerts 228 in FIG. 2) for suspicious logins, and reporting the incidents to a security analyst. The incidents (or alerts) can include contextual information pertaining to the hosts identified as outliers. Additionally, a graphical representation of the incidents generated over a given period of time (for example, in a particular day) can be displayed to an analyst.

Figure 3:
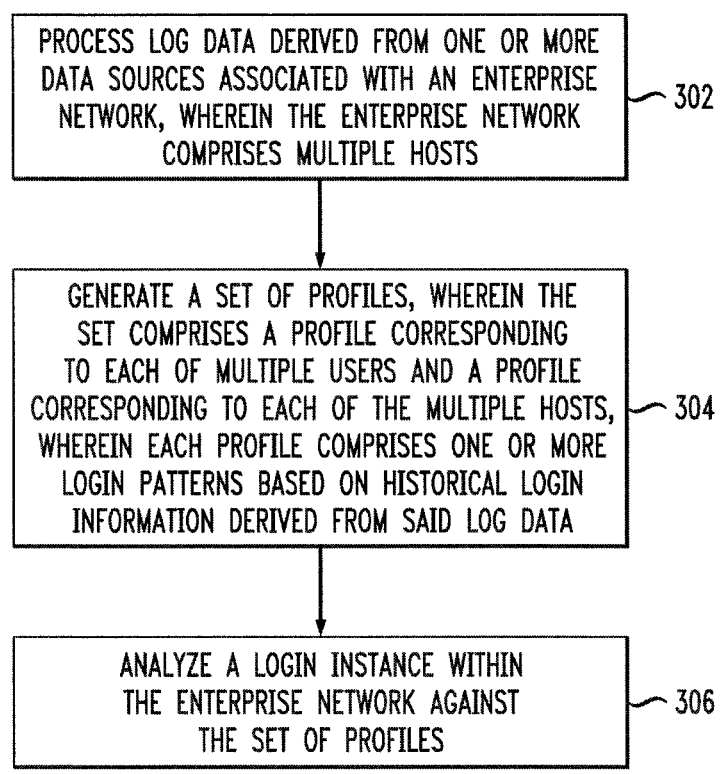
FIG. 3 is a flow diagram illustrating techniques according to an embodiment of the invention.

FIG. 3 is a flow diagram illustrating techniques according to an embodiment of the present invention. Step 302 includes processing log data derived from one or more data sources associated with an enterprise network, wherein the enterprise network comprises multiple hosts. Processing can include normalizing the log data, wherein normalizing can include normalizing a timestamp associated with each item of said log data into a common time zone. Normalizing can also include establishing a mapping between each IP address associated with said log data and a unique identifier for each of said multiple host devices.

Additionally, as described herein, the data sources can include a dynamic host configuration protocol server, a domain controller, a virtual private network server, a web proxy, enterprise malware, etc.

Step 304 includes generating a set of profiles, wherein the set comprises a profile corresponding to each of multiple users and a profile corresponding to each of the multiple hosts, wherein each profile comprises one or more login patterns based on historical login information derived from said log data. The set can include a profile corresponding to each of the multiple users and a profile corresponding to each of the multiple hosts associated with authentication attempts within the enterprise network observed over a specified period of time.

A profile corresponding to a user can include, for example, a list of one or more hosts onto which the user successfully logged in, the number of times that the user logged on to each of the one or more hosts, and a timestamp corresponding to the first login instance and the last login instance for the user and each of the one or more hosts. A host's profile can include information such as, for example, the list of users that logged in to that host, the number of times each user logged in, and the timestamps of the first and last login from each user.

Also, at least one embodiment of the invention includes removing a host from the user profile after the user has not logged in to the host for a specified amount of time. Further, the techniques depicted in FIG. 3 can additionally include updating the set of profiles upon the processing of additional log data.

Step 306 includes analyzing a login instance within the enterprise network against the set of profiles. The techniques depicted in FIG. 3 can also include identifying the login instance as inconsistent with the one or more login patterns contained in one or more profiles from the set of profiles. Additionally, at least one embodiment of the invention includes computing a score for each user and each host associated with the inconsistent login instance, wherein the score captures the degree of inconsistency. Computing a score can include, for example, computing the score for each user and each host using one or more weights assigned to one or more users and one or more hosts.

The techniques depicted in FIG. 3 can additionally include applying a graph partitioning algorithm to a graph constructed from multiple login instances.

Figure 4:
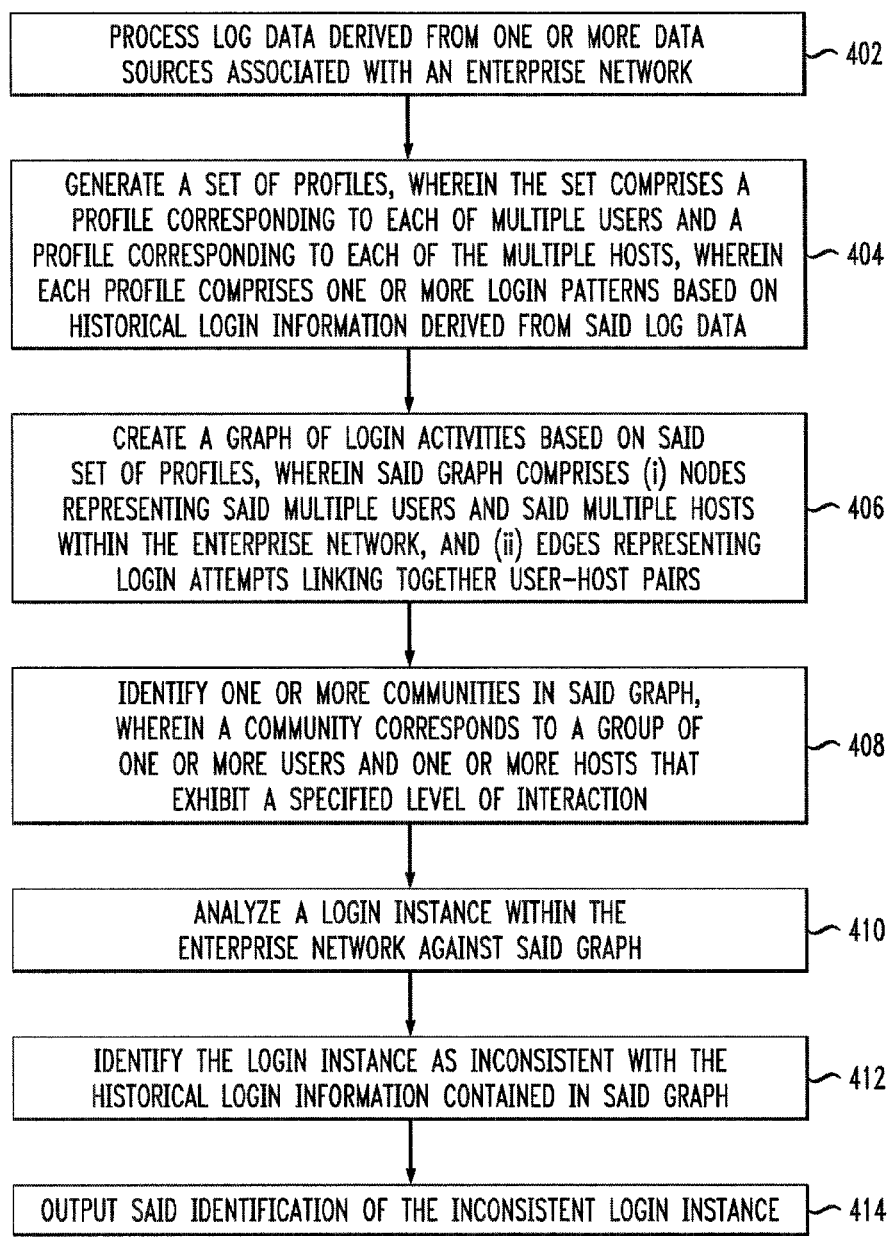
FIG. 4 is a flow diagram illustrating techniques according to an embodiment of the invention.

FIG. 4 is a flow diagram illustrating techniques according to an embodiment of the present invention. Step 402 includes processing log data derived from one or more data sources associated with an enterprise network. Step 404 includes generating a set of profiles, wherein the set comprises a profile corresponding to each of multiple users and a profile corresponding to each of the multiple hosts, wherein each profile comprises one or more login patterns based on historical login information derived from said log data. Step 406 includes creating a graph of login activities based on said set of profiles, wherein said graph comprises (i) nodes representing said multiple users and said multiple hosts within the enterprise network, and (ii) edges representing login attempts linking together user-host pairs.

Step 408 includes identifying one or more communities in said graph, wherein a community corresponds to a group of one or more users and one or more hosts that exhibit a specified level of interaction. Step 410 includes analyzing a login instance within the enterprise network against said graph. Step 412 includes identifying the login instance as inconsistent with the historical login information contained in said graph. Step 414 includes outputting said identification of the inconsistent login instance.

Figure 5:
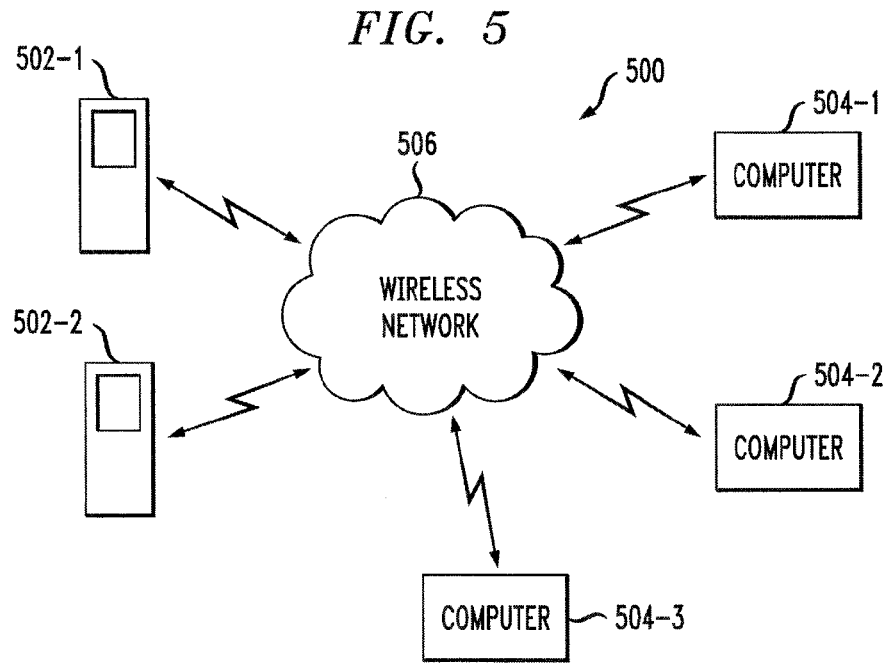
FIG. 5 shows an exemplary embodiment of a communication system that may incorporate the functionality of the type illustrated in at least one embodiment of the invention.

Network login analysis techniques of the type described herein may be implemented in a wide variety of different applications. One exemplary communication system applications that may incorporate such techniques will now be described with reference to FIG. 5. Accordingly, FIG. 5 depicts a communication system 500 comprising a plurality of mobile telephones 502-1 and 502-2 and computers 504-1, 504-2 and 504-3, configured to communicate with one another over a network 506. For instances, such mobile telephones (for example, smart phones) and computers can be devices associated with employees and/or users within an enterprise network. It should also be noted and appreciated that despite the limited number of devices illustrated in FIG. 5, the techniques described herein are scalable and, accordingly, can also be incorporated and/or implemented in connection with networks of much larger size.

Any two or more of the devices 502 and 504 may correspond to computing devices configured to implement at least one embodiment of the invention, as previously described. It is to be appreciated that the techniques disclosed herein can be implemented in numerous other applications.

Aspects of the present invention are described herein with reference to flowchart illustrations and/or block diagrams of methods, apparatus, systems and computer program products according to embodiments of the invention. It is to be appreciated that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

As further described herein, such computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. Accordingly, as further detailed below, at least one embodiment of the invention includes an article of manufacture tangibly embodying computer readable instructions which, when implemented, cause a computer to carry out techniques described herein.

The computer program instructions may also be loaded onto a computer or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, component, segment, or portion of code, which comprises at least one executable instruction for implementing the specified logical function(s). It should be noted that the functions noted in the block may occur out of the order noted in the figures.

Accordingly, the techniques described herein can include providing a system, wherein the system includes distinct software modules, each being embodied on a tangible computer-readable recordable storage medium (for example, all modules embodied on the same medium, or each module embodied on a different medium). The modules can run, for example, on a hardware processor, and the techniques detailed herein can be carried out using the distinct software modules of the system executing on a hardware processor.

Additionally, the techniques detailed herein can also be implemented via a computer program product that includes computer useable program code stored in a computer readable storage medium in a data processing system, wherein the computer useable program code was downloaded over a network from a remote data processing system. The computer program product can also include, for example, computer useable program code that is stored in a computer readable storage medium in a server data processing system, wherein the computer useable program code is downloaded over a network to a remote data processing system for use in a computer readable storage medium with the remote system.

As will be appreciated by one skilled in the art, aspects of the present invention may take the form of an entirely hardware embodiment, an entirely software embodiment (including firmware, resident software, micro-code, etc.) or an embodiment combining software and hardware aspects that may all generally be referred to herein as a "module" or "system."

An aspect of the invention or elements thereof can be implemented in the form of an apparatus including a memory and at least one processor that is coupled to the memory and operative to perform the techniques detailed herein. Also, as described herein, aspects of the present invention may take the form of a computer program product embodied in a computer readable medium having computer readable program code embodied thereon.

Figure 6:
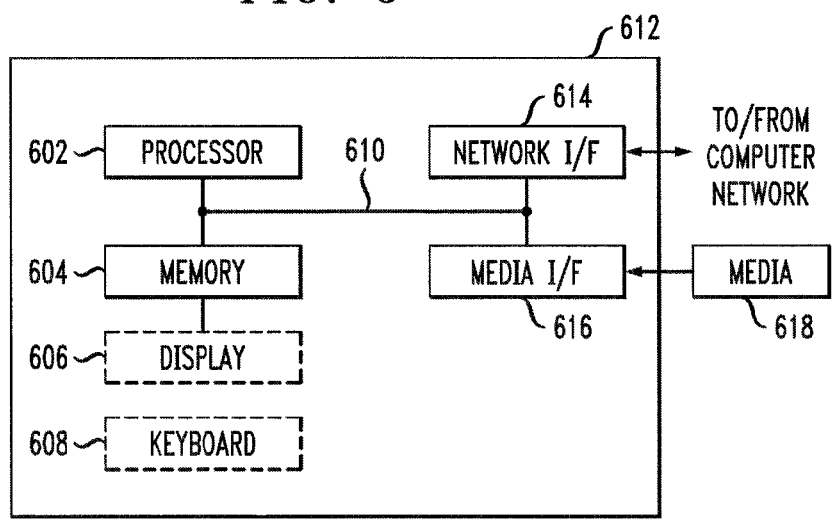
FIG. 6 is a system diagram of an exemplary computer system on which at least one embodiment of the invention can be implemented.

By way of example, an aspect of the present invention can make use of software running on a general purpose computer. As noted above, FIG. 6 is a system diagram of an exemplary computer system on which at least one embodiment of the invention can be implemented. As depicted in FIG. 6, an example implementation employs, for example, a processor 602, a memory 604, and an input/output interface formed, for example, by a display 606 and a keyboard 608. The term "processor" as used herein includes any processing device(s), such as, for example, one that includes a central processing unit (CPU) and/or other forms of processing circuitry. The term "memory" includes memory associated with a processor or CPU, such as, for example, random access memory (RAM), read only memory (ROM), a fixed memory device (for example, a hard drive), a removable memory device (for example, a diskette), a flash memory, etc. Further, the phrase "input/output interface," as used herein, includes a mechanism for inputting data to the processing unit (for example, a mouse) and a mechanism for providing results associated with the processing unit (for example, a printer).

The processor 602, memory 604, and input/output interface such as display 606 and keyboard 608 can be interconnected, for example, via bus 610 as part of a data processing unit 612. Suitable interconnections via bus 610, can also be provided to a network interface 614 (such as a network card), which can be provided to interface with a computer network, and to a media interface 616 (such as a diskette or compact disc read-only memory (CD-ROM) drive), which can be provided to interface with media 618.

Accordingly, computer software including instructions or code for carrying out the techniques detailed herein can be stored in associated memory devices (for example, ROM, fixed or removable memory) and, when ready to be utilized, loaded in part or in whole (for example, into RAM) and implemented by a CPU. Such software can include firmware, resident software, microcode, etc.

As noted above, a data processing system suitable for storing and/or executing program code includes at least one processor 602 coupled directly or indirectly to memory elements 604 through a system bus 610. The memory elements can include local memory employed during actual implementation of the program code, bulk storage, and cache memories which provide temporary storage of at least some program code in order to reduce the number of times code must be retrieved from bulk storage during implementation. Also, input/output (I/O) devices such as keyboards 608, displays 606, and pointing devices, can be coupled to the system either directly (such as via bus 610) or through intervening I/O controllers.

Network adapters such as network interface 614 (for example, a modem, a cable modem or an Ethernet card) can also be coupled to the system to enable the data processing system to become coupled to other data processing systems or remote printers or storage devices through intervening private or public networks.

As used herein, a "server" includes a physical data processing system (such as system 612 as depicted in FIG. 6) running a server program. It will be understood that such a physical server may or may not include a display and keyboard.

As noted, at least one embodiment of the invention can take the form of a computer program product embodied in a computer readable medium having computer readable program code embodied thereon. As will be appreciated, any combination of computer readable media may be utilized. The computer readable medium can include a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Examples include an electrical connection having one or more wires, a portable computer diskette, a hard disk, RAM, ROM, an erasable programmable read-only memory (EPROM), flash memory, an optical fiber, a portable CD-ROM, an optical storage device, a magnetic storage device, and/or any suitable combination of the foregoing. More generally, a computer readable storage medium may be any tangible medium that can contain, or store a program for use by or in connection with an instruction execution system, apparatus, or device.

Additionally, a computer readable signal medium may include a propagated data signal with computer readable program code embodied therein, for example, in baseband or as part of a carrier wave. Such a propagated signal may take any of a variety of forms such as, for example, electro-magnetic, optical, or a suitable combination thereof. More generally, a computer readable signal medium may be any computer readable medium that is not a computer readable storage medium and that can communicate, propagate, or transport a program for use by or in connection with an instruction execution system, apparatus, or device.

Program code embodied on a computer readable medium can be transmitted using an appropriate medium such as, for example, wireless, wireline, optical fiber cable, radio frequency (RF), and/or a suitable combination of the foregoing. Computer program code for carrying out operations in accordance with one or more embodiments of the invention can be written in any combination of at least one programming language, including an object oriented programming language, and conventional procedural programming languages. The program code may execute entirely on a user's computer, partly on a user's computer, as a stand-alone software package, partly on a user's computer and partly on a remote computer, or entirely on the remote computer or server. In the latter scenario, the remote computer may be connected to the user's computer through any type of network, including a LAN or a WAN, or the connection may be made to an external computer (for example, through the Internet using an Internet Service Provider).

In light of the above descriptions, it should be understood that the components illustrated herein can be implemented in various forms of hardware, software, or combinations thereof, for example, application specific integrated circuit(s) (ASICS), functional circuitry, an appropriately programmed general purpose digital computer with associated memory, etc.

Terminology used herein is for the purpose of describing particular embodiments only and is not intended to be limiting of the invention. For example, the singular forms "a," "an" and "the" are intended to include the plural forms as well, unless clearly indicated otherwise. It will be further understood that the terms "comprises" and/or "comprising," as used herein, specify the presence of stated features, integers, steps, operations, elements, and/or components, but do not preclude the presence or addition of another feature, integer, step, operation, element, component, and/or group thereof. Additionally, the corresponding structures, materials, acts, and equivalents of all means or step plus function elements in the claims are intended to include any structure, material, or act for performing the function in combination with other claimed elements as specifically claimed.

Also, it should again be emphasized that the above-described embodiments of the invention are presented for purposes of illustration only. Many variations and other alternative embodiments may be used. For example, the techniques are applicable to a wide variety of other types of communication systems and computing devices that can benefit from network login analysis techniques. Accordingly, the particular illustrative configurations of system and device elements detailed herein can be varied in other embodiments. These and numerous other alternative embodiments within the scope of the appended claims will be readily apparent to those skilled in the art.

What is claimed is:

1. A method comprising steps of:
processing log data derived from one or more data sources associated with an enterprise network, wherein the enterprise network comprises multiple hosts;
generating a set of profiles, wherein the set comprises profiles corresponding to respective ones of multiple users and profiles corresponding to respective ones of the multiple hosts, wherein each profile comprises historical login information derived from said log data;
creating a graph based on said set of profiles, wherein said graph comprises (i) nodes representing said multiple users and said multiple hosts within the enterprise network, (ii) edges representing login instances linking together user-host pairs, and (iii) one or more communities identified among the nodes, wherein each community corresponds to a group of one or more users and one or more hosts that exhibit at least a specified level of interaction;
analyzing a login instance within the enterprise network against the graph;
identifying the login instance as inconsistent with the historical login information based on said graph; and
outputting said identification of the inconsistent login instance;
wherein said steps are carried out by at least one computing device.

2. The method of claim 1, further comprising:
computing a score for each user and each host associated with the inconsistent login instance, wherein said score captures a degree of inconsistency corresponding to the inconsistent login instance.

3. The method of claim 2, wherein said computing comprises computing the score for each user and each host using one or more weights.

4. The method of claim 1, further comprising:
applying a graph partitioning algorithm to the graph.

5. The method of claim 1, wherein said processing comprises normalizing said log data.

6. The method of claim 5, wherein said normalizing comprises normalizing a timestamp associated with each item of said log data into a common time zone.

7. The method of claim 5, wherein said normalizing comprises establishing a mapping between each internet protocol (IP) address associated with said log data and a unique identifier for each of said multiple hosts.

8. The method of claim 1, wherein said one or more data sources comprises a dynamic host configuration protocol server.

9. The method of claim 1, wherein said one or more data sources comprises a domain controller.

10. The method of claim 1, wherein said one or more data sources comprises a virtual private network server.

11. The method of claim 1, wherein said one or more data sources comprises a web proxy.

12. The method of claim 1, wherein said one or more data sources comprises enterprise malware.

13. The method of claim 1, wherein a profile corresponding to a given one of the multiple users comprises:
a list of one or more of the multiple hosts onto which the given user successfully logged in;
the number of times that the given user logged on to each of the one or more hosts; and
a timestamp corresponding to the first login instance and the last login instance for the given user and each of the one or more hosts.

14. The method of claim 13, further comprising:
removing a given host from the profile after the given user has not logged in to the given host for a specified amount of time.

15. The method of claim 1, further comprising:
updating the set of profiles upon the processing of additional log data.

16. The method of claim 1, wherein said generating comprises generating the set of profiles for the multiple users and the multiple hosts based on authentication attempts within the enterprise network observed over a specified period of time.

17. An article of manufacture comprising a non-transitory processor-readable storage medium having processor-readable instructions tangibly embodied thereon which, when implemented, cause a processor to carry out steps comprising:
processing log data derived from one or more data sources associated with an enterprise network, wherein the enterprise network comprises multiple hosts;
generating a set of profiles, wherein the set comprises profiles corresponding to respective ones of multiple users and profiles corresponding to respective ones of the multiple hosts, wherein each profile comprises historical login information derived from said log data;
creating a graph based on said set of profiles, wherein said graph comprises (i) nodes representing said multiple users and said multiple hosts within the enterprise network, (ii) edges representing login instances linking together user-host pairs, and (iii) one or more communities identified among the nodes, wherein each community corresponds to a group of one or more users and one or more hosts that exhibit at least a specified level of interaction;
analyzing a login instance within the enterprise network against the graph;
identifying the login instance as inconsistent with the historical login information based on said graph; and
outputting said identification of the inconsistent login instance.

18. The article of manufacture of claim 17, wherein the steps further comprise: computing a score for each user and each host associated with the inconsistent login instance, wherein said score captures a degree of inconsistency corresponding to the inconsistent login instance.

19. The article of manufacture of claim 18, wherein said computing comprises computing the score for each user and each host using one or more weights.

20. An apparatus comprising:
a memory; and
at least one processor coupled to the memory; and
a plurality of modules executing on the at least one processor, wherein the plurality of modules comprise:
a normalization module configured to process log data derived from one or more data sources associated with an enterprise network, wherein the enterprise network comprises multiple hosts;
a behavioral profiler module configured to generate a set of profiles, wherein the set comprises profiles corresponding to respective ones of multiple users and profiles corresponding to respective ones of the multiple hosts, wherein each profile comprises historical login information derived from said log data;
an analysis module configured to:
create a graph based on said set of profiles, wherein said graph comprises (i) nodes representing said multiple users and said multiple hosts within the enterprise network, (ii) edges representing login instances linking together user-host pairs, and (iii) one or more communities identified among the nodes, wherein each community corresponds to a group of one or more users and one or more hosts that exhibit at least a specified level of interaction;
analyze a login instance within the enterprise network against the graph;
identify the login instance as inconsistent with the historical login information based on said graph; and
output said identification of the inconsistent login instance.

\* \* \* \* \*